United States Patent
Wu et al.

(10) Patent No.: US 10,187,239 B2
(45) Date of Patent: Jan. 22, 2019

(54) SYSTEMS AND METHODS TO REDUCE THE PEAK-TO-AVERAGE POWER RATIO (PAPR) OF SIGNALS IN CHANNEL BONDING

(71) Applicant: Huawei Technologies Co., Ltd., Shenzhen (CN)

(72) Inventors: Tao Wu, Shenzhen (CN); Yan Xin, Kanata (CA); Min Yan, Shenzhen (CA); Sheng Sun, Kanata (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 225 days.

(21) Appl. No.: 15/140,697

(22) Filed: Apr. 28, 2016

(65) Prior Publication Data

US 2017/0134235 A1     May 11, 2017

Related U.S. Application Data

(60) Provisional application No. 62/251,598, filed on Nov. 5, 2015.

(51) Int. Cl.
*H04L 5/00* (2006.01)
*H04L 27/26* (2006.01)

(52) U.S. Cl.
CPC ...... *H04L 27/2621* (2013.01); *H04L 27/2613* (2013.01); *H04L 5/001* (2013.01); *H04L 5/003* (2013.01)

(58) Field of Classification Search
CPC . H04L 27/2621; H04L 27/2613; H04L 5/001; H04L 5/003
See application file for complete search history.

(56) References Cited

U.S. PATENT DOCUMENTS

| | | | |
|---|---|---|---|
| 8,503,551 B2 | 8/2013 | Ko et al. | |
| 2005/0174927 A1* | 8/2005 | Stephens | H04L 27/20 370/206 |
| 2006/0022354 A1 | 2/2006 | Anzai | |
| 2010/0013082 A1 | 1/2010 | Lin | |

(Continued)

FOREIGN PATENT DOCUMENTS

| | | |
|---|---|---|
| CN | 102100067 A | 6/2011 |
| CN | 104144140 A | 11/2014 |
| WO | 2010139095 A1 | 12/2010 |

OTHER PUBLICATIONS

IEEE, "IEEE Standard for Information technology-Telecommunications and information exchange between systems Local and metropolitan area networks-Specific requirements; Part 11: Wireless LAN Medium Access Control (MAC) and Physical Layer (PHY) Specifications Amendment 3: Enhancements for Very High Throughput in the 60 GHz Band," IEEE Std 802.11ad, Dec. 28, 2012, pp. 1-628.

*Primary Examiner* — Kevin C. Harper
(74) *Attorney, Agent, or Firm* — Slater Matsil, LLP

(57) ABSTRACT

It is possible to reduce the PAPR of an amplified signal communicated over bonded channels by applying different phase shifts to control fields communicated over the bonded channels. The phase shifts reduce the amount of constructive interaction between the control fields by shifting the peaks of the respective signals in the time domain. The control fields may include short training fields (STFs), channel estimation (CE) fields, or header fields communicated over bonded channels.

20 Claims, 11 Drawing Sheets

(56) References Cited

U.S. PATENT DOCUMENTS

| | | | |
|---|---|---|---|
| 2011/0170627 A1* | 7/2011 | Kwon | H04L 25/0204 375/295 |
| 2012/0051454 A1* | 3/2012 | Zheng | H04L 5/0048 375/295 |
| 2014/0198739 A1* | 7/2014 | Kenney | H04L 1/08 370/329 |
| 2015/0349995 A1* | 12/2015 | Zhang | H04L 5/0048 375/295 |

* cited by examiner

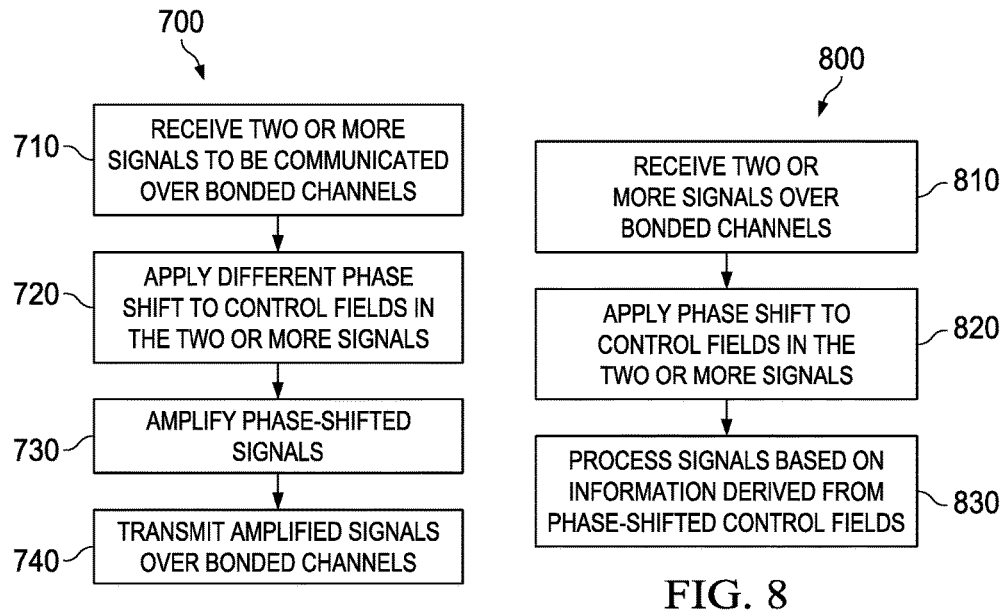
FIG. 7
FIG. 8
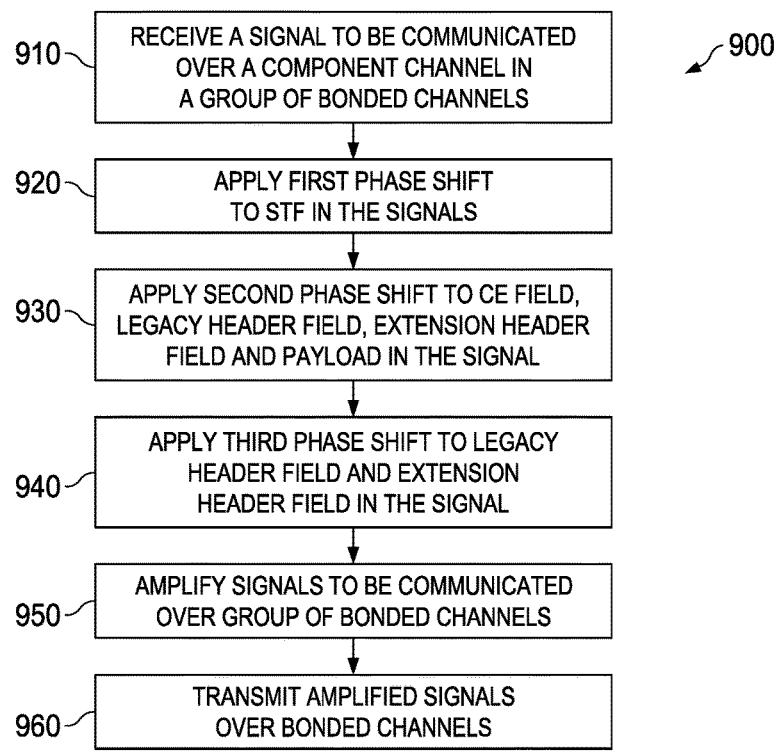
FIG. 9

SYSTEMS AND METHODS TO REDUCE THE PEAK-TO-AVERAGE POWER RATIO (PAPR) OF SIGNALS IN CHANNEL BONDING

This patent application claims priority to U.S. Provisional Application No. 62/251,598, filed on Nov. 11, 2015 and entitled "Systems and Methods to Reduce the Peak-to-Average Power Ratio (PAPR) of Signals in Channel Bonding," which is hereby incorporated by reference herein as if reproduced in its entirety.

TECHNICAL FIELD

The present invention relates to telecommunications, and, in particular embodiments, to techniques for systems and methods to reduce the Peak-to-Average Power Ratio (PAPR) of signals in channel bonding.

BACKGROUND

Power amplifiers are used to amplify baseband signals prior to signal transmission. To provide acceptable performance, power amplifiers may need to operate in a linear manner such that gain can be achieved without excessive signal distortion. One characteristic that heavily influences power amplifier performance is the PAPR of the signal being amplified, which is generally defined as the peak power of the waveform divided by average power of the waveform. In particular, power amplifiers will typically exhibit non-linear gain characteristics when the PAPR of a signal exceeds the amplifier's linear operable range. The PAPR of a given signal is affected by the waveform used to transmit the signal and the amount of gain provided by the amplifier.

SUMMARY OF THE INVENTION

Technical advantages are generally achieved by embodiments of this disclosure which describe systems and methods to reduce the Peak-to-Average Power Ratio (PAPR) of signals in channel bonding.

In accordance with an embodiment, a method for peak-to-average power ratio (PAPR) reduction in channel bonding is provided. In this example, the method includes receiving at least a first signal assigned to a first component channel and a second signal assigned to a second component channel. The first signal includes a first control field carrying an identical sequence of symbols as a second control field in the second signal. The first control field and the second control field are assigned to the same time period. The method further includes applying a phase shift to at least the second control field such that the identical sequence of symbols in the second control field is offset from the identical sequence of symbols in the first control field in the time domain, and transmitting the first signal over the first channel and the second signal over the second channel. An apparatus for performing this method is also provided.

In accordance with another embodiment, yet another method for peak-to-average power ratio (PAPR) reduction in channel bonding is provided. In this example, the method includes receiving at least a first signal assigned to a first component channel and a second signal assigned to a second component channel. Both the first signal and the second signal include a short training field (STF), channel estimation (CE) field, and a header field. Both the STF in the first signal and the STF in the second signal being assigned to a first time period. Both the CE field in the first signal and the CE field in the second signal being assigned to a second time period. Both the header field in the first signal and the header field in the second signal being assigned to a third time period. The method further includes applying a first phase shift to the STF in the second signal, a second phase shift to the CE in the second signal and a third phase shift to the header field in the second signal, and transmitting the first signal over the first channel and the second signal over the second channel. An apparatus for performing this method is also provided.

BRIEF DESCRIPTION OF THE DRAWINGS

For a more complete understanding of the present invention, and the advantages thereof, reference is now made to the following description taken in conjunction with the accompanying drawings, in which:

FIG. 7 is a flowchart of an embodiment method for transmitting signals over bonded channels;

FIG. 8 is a flowchart of an embodiment method for receiving signals over bonded channels;

FIG. 9 is a flowchart of an embodiment method for transmitting SC signals over bonded channels;

DETAILED DESCRIPTION OF ILLUSTRATIVE EMBODIMENTS

Figure 1:
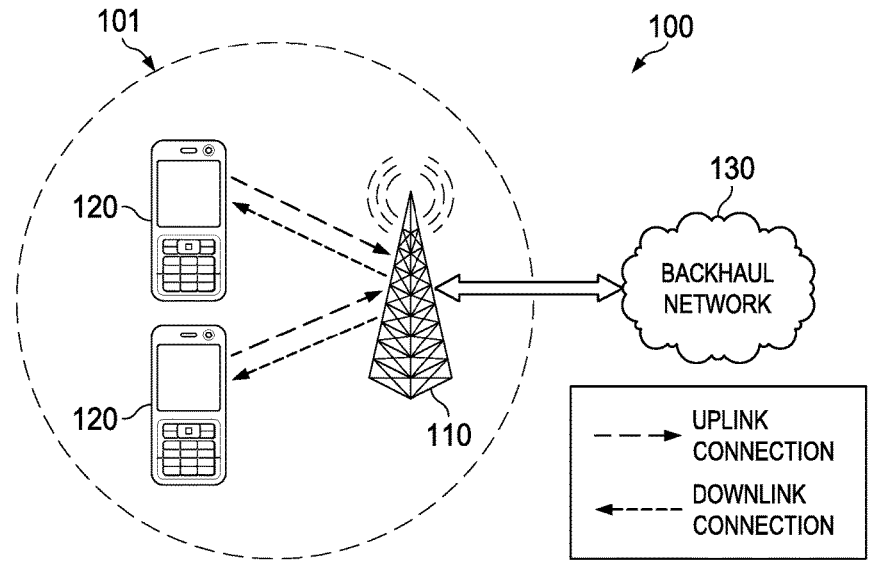
FIG. 1 is a diagram of an embodiment wireless communications network.

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Next generation networks will likely implement channel bonding to increase the overall data rate available to mobile subscribers. Generally speaking, channel bonding occurs when two or more component channels carry data to the same user over adjacent frequency sub-bands. In this context, the two or more component channels are collectively referred to as bonded channels. Because the same control information may need to be conveyed in each channel, bonded channels will oftentimes carry identical control fields, such as short training fields (STFs), channel estimation (CE) fields, and header fields. As used herein, the phrase "identical control fields" refers to control fields having the same sequence of physical layer symbols. The identical control fields may generally be aligned in the time domain, which may result in an increased Peak-to-Average Power Ratio (PAPR) for the amplified signal, because constructive interaction between the physical layer signals may increase the overall peak of the amplified signal.

Aspects of this disclosure reduce the PAPR of an amplified signal communicated over bonded channels by applying different phase shifts to control fields communicated over the bonded channels. The phase shifts reduce the amount of constructive interaction between the control fields by shifting the peaks of the respective signals in the time domain. The control fields may include short training fields (STFs), channel estimation (CE) fields, or header fields communicated over bonded channels. In one embodiment, two or more signals are assigned to two bonded channels. Each signal carries an STF, a CE, and a header field. The STFs in the signals are assigned to a first timeslot, the CEs in the two or more signals are assigned to a second timeslot, and the header fields in the two or more signals are assigned to a third timeslot. Prior to signal amplification, phase shifts are applied to the STF, CE, and header field in at least one of the signals. The same phase shift may be applied to the STF, CE, and header field in a given one of the signals. Alternatively, different phase shifts may be applied to the respective STF, CE, and header field in a given signal. Applying the phase shifts to the STF, CE, and header fields in one of the signals creates, or increases, a time domain offset between signal peaks in the STF, the CE, and the header field in the given signal and corresponding signal peaks in the STF, the CE, and the header field in the other signal, or signals, in the two or more signals. The time domain offset reduces the PAPR experienced by the amplifier when the two or more signals are amplified to produce an amplified signal, which is then communicated over the bonded channels. These and other details are described in greater detail below.

FIG. 1 is a diagram of a wireless network 100 for communicating data. The wireless network 100 includes a base station 110 having a coverage area 101, a plurality of wireless devices 120, and a backhaul network 130. As shown, the base station 110 establishes uplink (dashed line) and/or downlink (dotted line) connections with the wireless devices 120, which serve to carry data from the wireless devices 120 to the base station 110 and vice-versa. Data carried over the uplink/downlink connections may include data communicated between the wireless devices 120, as well as data communicated to/from a remote-end (not shown) by way of the backhaul network 130. As used herein, the term "base station" refers to any component (or collection of components) configured to provide wireless access to a network, such as an evolved NodeB (eNB), a macro-cell, a femtocell, a Wi-Fi access point (AP), or other wirelessly enabled devices. Base stations may provide wireless access in accordance with one or more wireless communication protocols, e.g., long term evolution (LTE), LTE advanced (LTE-A), High Speed Packet Access (HSPA), Wi-Fi 802.11a/b/g/n/ac. As used herein, the term "wireless device" refers to any component (or collection of components) capable of establishing a wireless connection with a base station. The terms "wireless device," "user equipment (UE)," and "mobile station (STA)" are used interchangeably throughout this disclosure. In some embodiments, the network 100 may comprise various other wireless devices, such as relays, low power nodes, etc.

Figure 2:
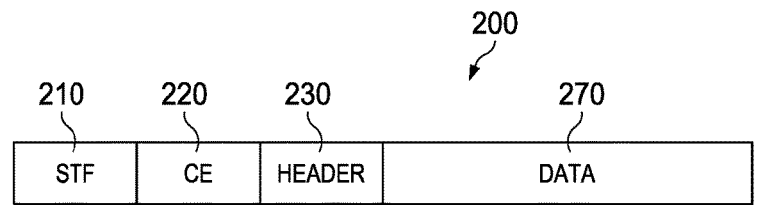
FIG. 2 is a diagram of a frame structure defined by Institute of Electrical and Electronics Engineers (IEEE) standard specification 802.11ad.

Institute of Electrical and Electronics Engineers (IEEE) standard specification 802.11ay is being developed to define a physical layer for a 60 GigaHertz (GHz) spectrum, and will be an extension of IEEE 802.11ad (2013), which is incorporated by reference herein as if reproduced in its entirety. FIG. 2 is a diagram of a frame structure 200 for an IEEE 802.11ad network. As shown, the embodiment frame structure 200 includes a short training field (STF) 210, a channel estimation (CE) field 220, a header 230, and a payload 250. The STF 210 is used for synchronization, and the CE field 220 is used to estimate a channel impulse response. The channel impulse response may be used for equalization when detecting the header 230 and/or the payload 250. Both the STF 210 and the CE field 220 carry sequences of symbols defined by IEEE 802.11ad, and these symbols may constitute a priori information to wireless devices adapted to communicate in accordance with IEEE 802.11ad. Because each symbol in a signal maps to a corresponding group of bits, the phrases "sequence of symbols" and "sequence of bits" are used interchangeably herein. The header 230 carries control information for decoding data carried in the payload 270.

Figure 3:
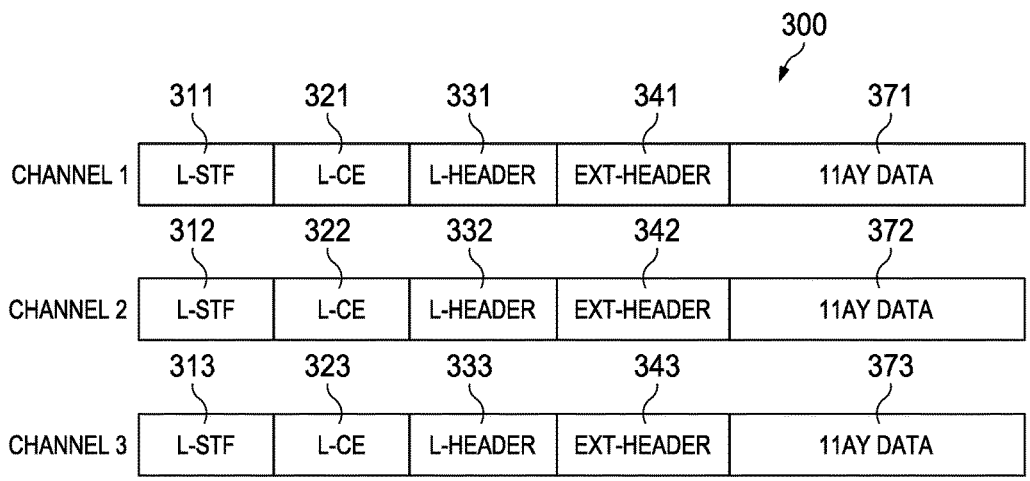
FIG. 3 is a diagram of a multiple channel frame structure for carrying data over bonded channels.

IEEE 802.11ay may implement channel bonding in order to provide data rates of 20 Gigabits per second (Gbps), or more, to mobile subscribers. FIG. 3 is a diagram of a frame structure 300 for carrying data over three bonded channels. The bonded channels may be transmitted using orthogonal frequency division multiplexed (OFDM) waveforms or single carrier (SC) waveforms. As shown, the embodiment frame structure 300 includes legacy STFs (L-STFs) 311, 312, 313, legacy CE (L-CE) fields 321, 322, 323, legacy headers (L-Headers) 331, 332, 333, extension headers (ext-Headers) 341, 342, 343, and payloads 371, 372, 373. The L-STFs 311, 312, 313, L-CE fields 321, 322, 323, and legacy headers 331, 332, 333 in the frame structure 300 may be similar to the STF 210, the CE field 220, and the header 230 (respectively) in the frame structure 200. The extension headers 341, 342, 342 may provide additional header information for wireless devices operating in accordance with IEEE 802.11ay.

Figure 4:
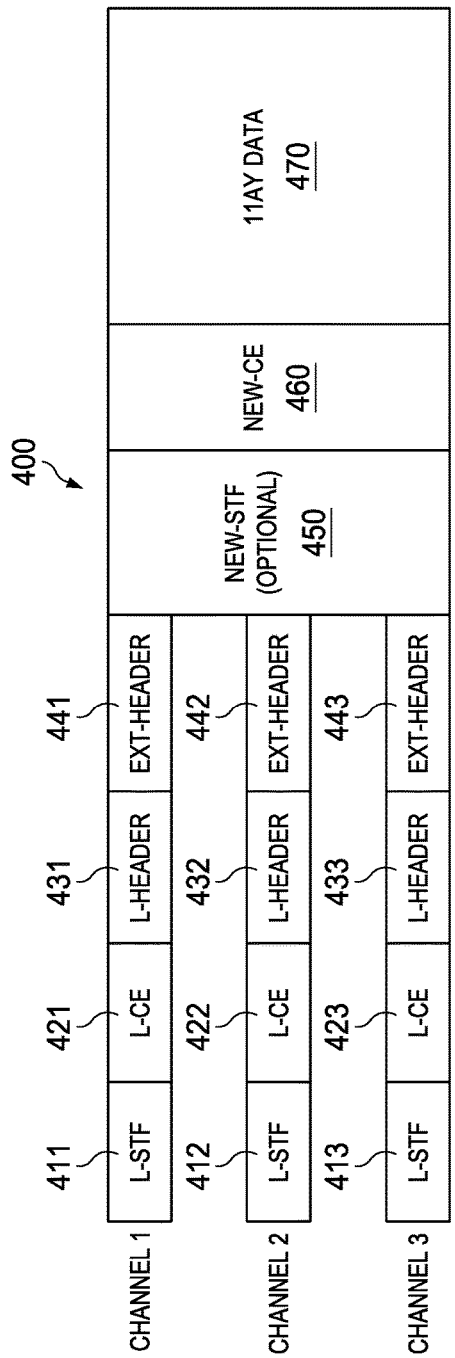
FIG. 4 is a diagram of a wideband frame structure for carrying data over bonded channels.

FIG. 4 is a diagram of a wideband frame structure 400 for carrying data over the bonded channels. The frame structure 400 may be transmitted using OFDM or SC waveforms. As shown, the wideband frame structure 400 includes L-STFs 411, 412, 413, L-CE fields 421, 422, 423, legacy headers 431, 432, 433, extension headers 441, 442, 443, a new IEEE 802.11ay STF (New-STF) 450, a new IEEE 802.11ay CE (New-CE) 460, and an IEEE 802.11ay payload (11ay-Data) 470. In this example, the New-STF 450 and the New-CE 460 may provide enhanced synchronization and channel estimation for wireless devices operating in accordance with IEEE 802.11ay. The New-STF 450, the New-CE 460, and the Data payload 470 may span guard-bands in-between channels 1, 2, and 3.

Figure 5:
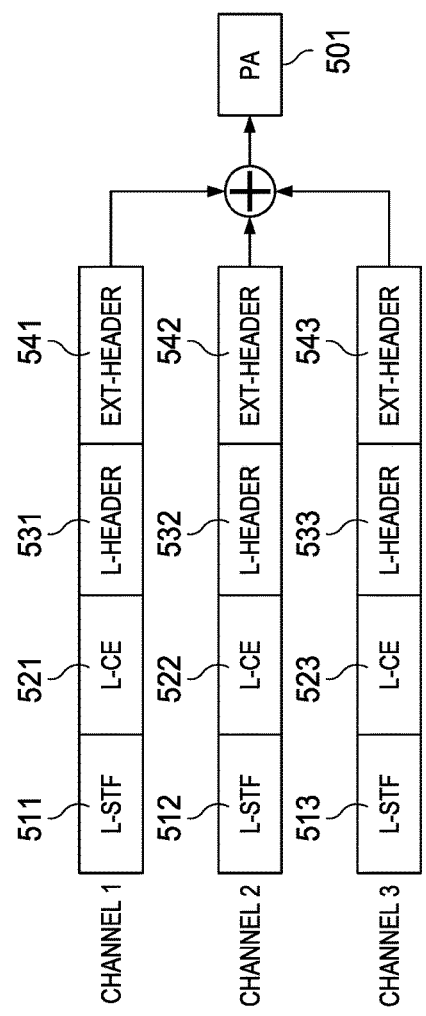
FIG. 5 is a diagram showing the use of an amplifier for amplifying control fields including Legacy Short Training Field (L-STF), Legacy Channel Estimation (L-CE), Legacy Header (L-Header) and Extended Header (ext-Header) communicated over bonded channels.

As mentioned above, bonded channels carrying identical short training fields (STFs), channel estimation (CE) fields, and header fields may increase the PAPR of the signal being amplified. FIG. 5 is a diagram of a scheme for amplifying control fields communicated over bonded channels. As shown, the control fields include L-STFs 511, 512, 513, L-CE fields 521, 522, 523, legacy headers 531, 532, 533, and extension headers 541, 542, 543, which may be similar to corresponding fields in the multiple channel frame structure 300 and/or the wideband frame structure 400. The L-STFs 511, 512, 513 constructively interact with one another to increase the PAPR of the signal amplified by the amplifier 501. A similar constructive interaction effect occurs between the L-CE fields 521, 522, 523, between the legacy headers 531, 532, 533, and between the extension headers 541, 542, 543.

Table 1 provides statistical results for PAPR for different channel scenarios. As shown, the PAPR of three bonded channels is roughly 2.3 times the PAPR of a single channel.

TABLE 1

| | Number of Channels | | |
|---|---|---|---|
| | 1 | 2 | 3 |
| PAPR (dB) | 3.01 | 5.44 | 6.92 |

Figure 6:
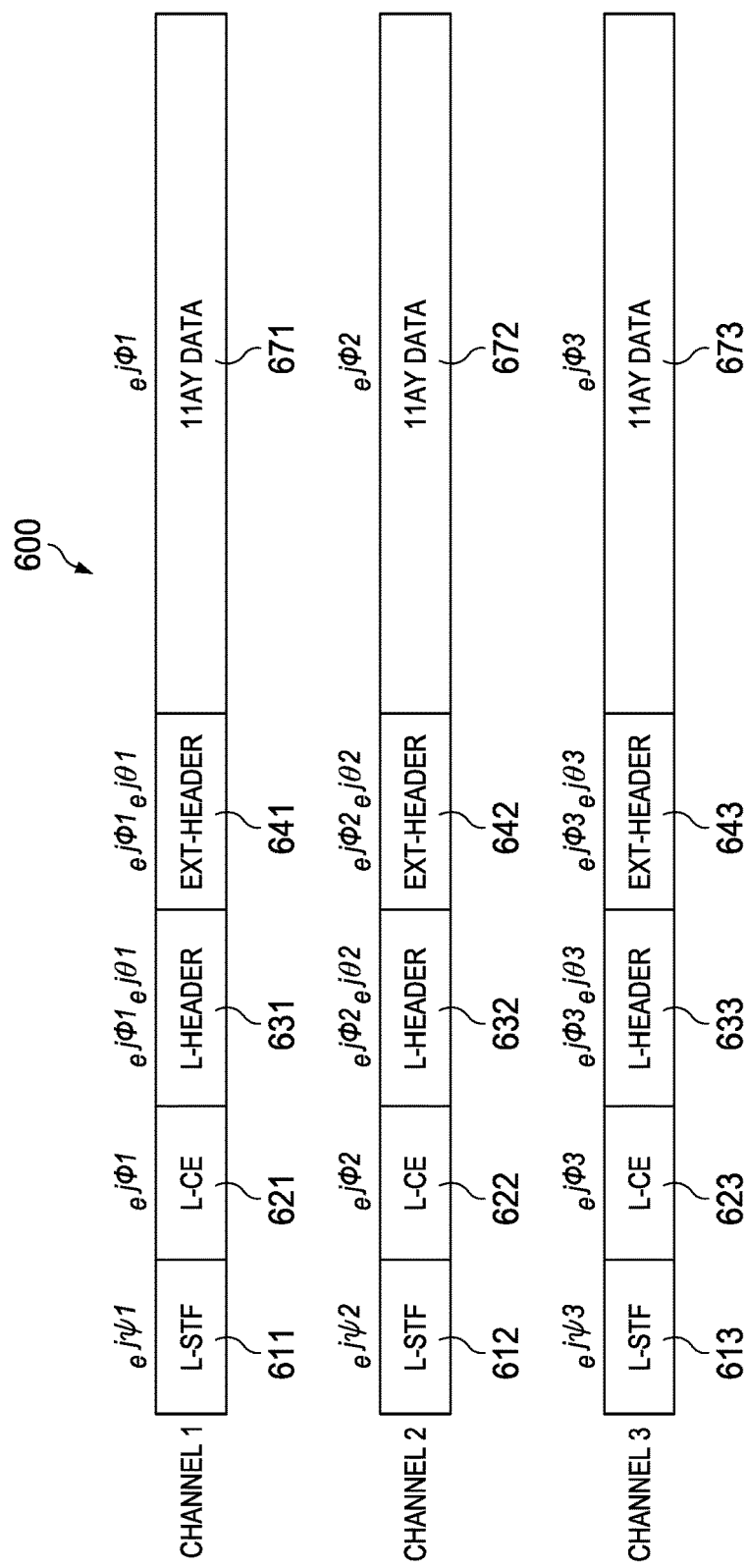
FIG. 6 is a diagram of an embodiment multiple channel frame structure for carrying data over bonded channels using single carrier (SC) waveforms.

Aspects of this disclosure reduce the PAPR over bonded channels by applying different phase shifts to corresponding control fields communicated over the bonded channels. FIG. 6 is a diagram of an embodiment frame structure 600 for carrying data over three bonded channels using SC waveforms. As shown, the embodiment frame structure 600 includes L-STFs 611, 612, 613, L-CE fields 621, 622, 623, legacy headers 631, 632, 633, extension headers 641, 642, 643, and payloads 671, 672, 673. In this example, different phase shifts are applied to different control fields. In particular, phase shifts $e^{j\psi_1}$, $e^{j\psi_2}$, $e^{j\psi_3}$ are applied to the L-STFs 611, 612, 613 (respectively), and phase shifts $e^{j\Phi_1}$, $e^{j\Phi_2}$, $e^{j\Phi_3}$ are applied to the L-CE fields 621, 622, 623. These phases may be selected to minimize the PAPR of the overall transmission in control fields.

The L-CE fields are used to estimate channel state information, which may be used to decode the legacy headers 631, 632, 633, extension headers 641, 642, 643, and payloads 671, 672, 673. Accordingly, the phase shifts $e^{j\Phi_1}$, $e^{j\Phi_2}$, $e^{j\Phi_3}$ that were applied to the L-CE fields 621, 622, 623 are also applied to the legacy headers 631, 632, 633, extension headers 641, 642, 643, and payloads 671, 672, 673. In addition, phase shifts $e^{j\theta_1}$, $e^{j\theta_2}$, $e^{j\theta_3}$ are applied to the legacy headers 631, 632, 633 and the extension headers 641, 642, 643.

FIG. 7 is a flowchart of an embodiment method 700 for transmitting signals over bonded channels, as might be performed by a transmitter. At step 710, the transmitter receives, or otherwise generates, two or more signals for communicating over bonded channels. At least one control field is carried over each of the two or more channels, such as a STF, a CE field, a header field, and/or an extension header field. At step 720, the transmitter applies different phase shifts to control fields in the two or more signals. In one example, the transmitter applies a zero phase shift to a control field in one of the signals, and a different non-zero phase shift to the corresponding control fields in each of the other signals. In another example, a different non-zero phase shift is applied to control fields in each of the two or more signals. In some embodiments, the transmitter applies different phase shifts to different control fields in the same signal. For example, the transmitter may apply a first phase shift to a first control field (e.g., STF) in a signal, and apply a second phase shift to a second control field (e.g., CE field) in the signal. At step 730, the transmitter amplifies the phase-shifted signals. At step 740, the transmitter transmits the amplified signals over bonded channels.

FIG. 8 is a flowchart of an embodiment method 800 for receiving signals over bonded channels, as might be performed by a receiver. At step 810, the receiver receives two or more signals over bonded channels. At step 820, the receiver applies different phase shifts to control fields in the two or more signals. In some embodiments, the phase shifts for the control fields are a priori information to the receiver. In other embodiments, the phase shifts for control fields are blindly detected in the receiver using known pilot sequences and one or more known cyclic prefixes. In some embodiments, a phase shift applied to one of the control fields (e.g., the CE field) is also applied to other fields in the signal, e.g., header fields, the payload, etc. At step 830, the receiver processes the signals based on information derived from phase-shifted control fields.

FIG. 9 is a flowchart of an embodiment method 900 for transmitting SC signals over bonded channels, as might be performed by a transmitter. At step 910, the transmitter receives, or otherwise generates, a signal that is to be communicated over a component channel in a group of two or more bonded channels. The transmitter may also receive other signals to be communicated over bonded channels in the group of bonded channels. Each of the signals may carry identical control fields, including an STF, a CE field, a header field, and an extension header field. At step 920, the transmitter applies a first phase shift to an STF in the signal. The transmitter may also apply different phase shifts to STFs in the other signals to be communicated over the group of bonded channels. At step 930, the transmitter applies a second phase shift to a CE field, a legacy header field, an extension header field, and a payload field in the signal. The transmitter may also apply different phase shifts to corresponding fields in signals to be communicated over the other bonded channels. At step 940, the transmitter applies a third phase shift to the legacy header field and an extension header field in the signal. The transmitter may also apply different phase shifts to legacy and extension header fields in the other signals to be communicated over the other bonded channels. At step 950, the transmitter amplifies the signals to be communicated over bonded channels. At step 960, the transmitter transmits the signals over the bonded channels.

Figures 10, 11:
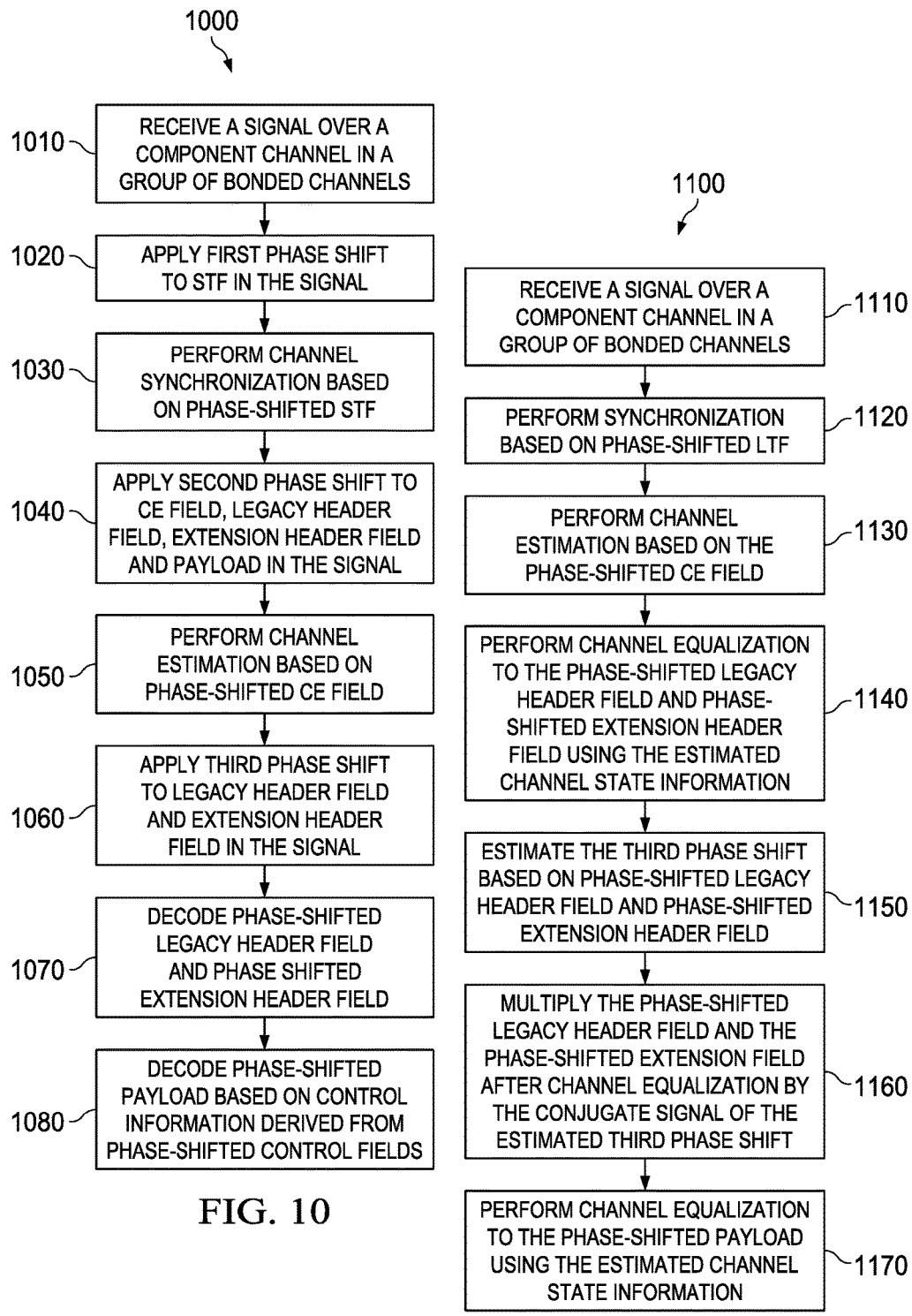
FIG. 10 is a flowchart of an embodiment method for receiving SC signals over bonded channels.
FIG. 11 is a flowchart of another embodiment method for receiving SC signals over bonded channels.

FIG. 10 is a flowchart of an embodiment method 1000 for receiving SC signals over bonded channels, as might be performed by a receiver. At step 1010, the receiver receives a signal over a component channel in a group of bonded channels. The receiver may also receive other signals over other bonded channels in the group of bonded channels. Each of the signals may carry identical control fields, including an STF, a CE field, a header field, and an extension header field. At step 1020, the receiver applies a first phase shift to an STF in the signal. The receiver may also apply different phase shifts to STFs in the other signals to be communicated over the group of bonded channels. At step 1030, the receiver performs channel synchronization on the phase-shifted STF. The receiver may also perform channel synchronization for the other bonded channels based on phase-shifted STFs corresponding to those channels.

At step 1040, the receiver applies a second phase shift to a CE field, a legacy header field, an extension header field, and a payload field in the signal. The receiver may apply different phase shifts to CE fields, legacy header fields, extension header fields, and payload fields in the other signals to be communicated over the other component channels in the set of bonded channels. At step 1050, the receiver performs channel estimation on the component channel based on the phase-shifted CE field. The receiver may also perform channel estimation for the other bonded channels based phase-shifted CE fields corresponding to those channels. At step 1060, the receiver applies a third phase shift to the legacy header field and the extension header field in the signal. The receiver may also apply different phase shifts to legacy and extension header fields communicated over the other bonded channels. At step 1070, the receiver decodes the phase-shifted legacy header field and the phase-shifted extension field. The receiver may also decode phase-shifted legacy and extension header fields communicated over the other bonded channels. At step 1080, the receiver decodes the phase-shifted payload based on control information derived from the phase-shifted control fields. The receiver may also decode phase-shifted payloads communicated over the other bonded channels.

FIG. 11 is a flowchart of another embodiment method for receiving SC signals over bonded channels. At step 1110, the receiver receives a signal over a component channel in a group of bonded channels. The receiver may also receive other signals over other bonded channels in the group of bonded channels. Each of the signals may carry identical control fields, including an STF, a CE field, a header field, and an extension header field.

At step 1120, the receiver performs signal synchronization on the phase-shifted STF. The receiver may perform signal synchronization for the other bonded channels based on phase-shifted STFs corresponding to those channels.

At step 1130, the receiver estimates channel state information for the component channel based on the phase-shifted CE field. The receiver may estimate channel state information for the other bonded channels based on phase-shifted CE fields corresponding to those channels.

At step 1140, the receiver performs channel equalization to the phase-shifted legacy header field and the phase-shifted extension field using the estimated channel state information based on the received phase-shifted CE field. The receiver may also perform channel equalization to the phase-shifted legacy and extension header fields communicated over the other bonded channels.

At step 1150, the receiver estimates the third phase shift based on the phase-shifted legacy header field and the phase-shifted extension field. The receiver may also estimate the third phase shift to the phase-shifted legacy header field and the phase-shifted extension field communicated over the other bonded channels.

At step 1160, the receiver multiplies the decoded phase-shifted legacy header field and the phase-shifted extension field after channel equalization by the conjugate signal of the estimated third phase shift. The receiver may also multiply the phase-shifted legacy header field and the phase-shifted extension field after channel equalization by the conjugate signal of the estimated third phase shift.

At step 1170, the receiver performs channel equalization to the phase-shifted payload using the estimated channel state information based on the received phase-shifted CE field. The receiver may also decode phase-shifted payloads communicated over the other bonded channels using the estimated channel state information based on the received phase-shifted CE field.

Figure 12:
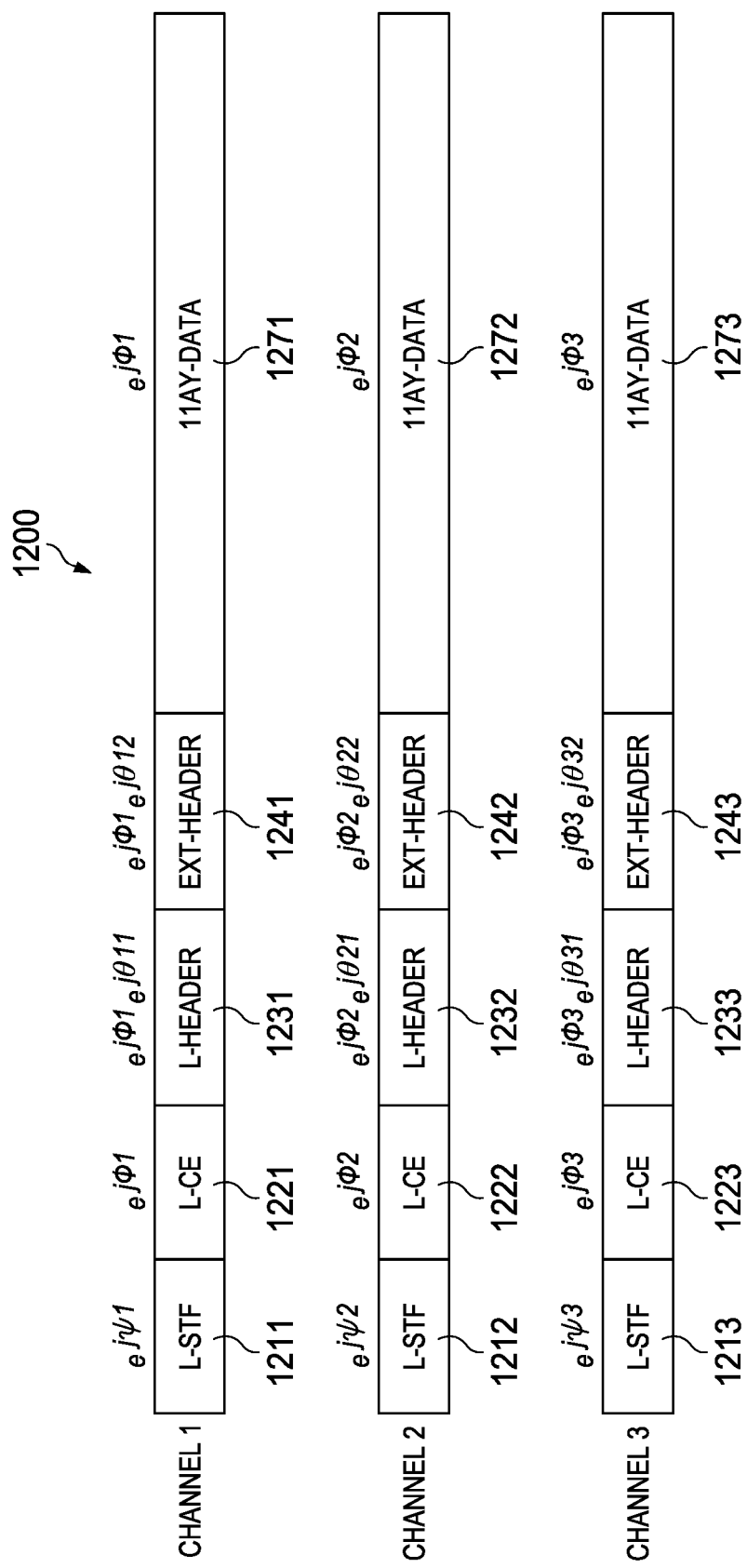
FIG. 12 is a diagram of an embodiment multiple channel frame structure for carrying data over bonded channels using OFDM waveforms.

FIG. 12 is a diagram of an embodiment frame structure 1200 for carrying data over three bonded channels using OFDM waveforms. As shown, the embodiment frame structure 1200 includes L-STFs 1211, 1212, 1213, L-CE fields 1221, 1222, 1223, legacy headers 1231, 1232, 1233, extension headers 1241, 1242, 1243, and payloads 1271, 1272, 1273. Different phase shifts are applied to different control fields to reduce the PAPR of the signal amplified by a corresponding power amplifier. The phase shifts applied to the embodiment frame structure 1200 are similar to those applied to the embodiment frame structure 600, except that optionally different phase shifts are applied to legacy headers and extension headers in the same channel of embodiment frame structure 1200.

This is due to the different use of guard intervals in OFDM and single carrier waveforms. In particular, single carrier symbols overlap at a guard interval in the time domain. Thus, the trailing guard interval in an L-Header 631 may be the leading guard interval in the extension header 641. Accordingly, the L-Header 631 and its overlapping ext-Header 641 must have a common phase shift. Every OFDM symbol has its guard interval which is called a cyclic prefix, such that the adjacent OFDM symbols do not overlap; as a result, different phase shifts may be applied to consecutive header fields containing OFDM symbols.

Figures 13, 14:
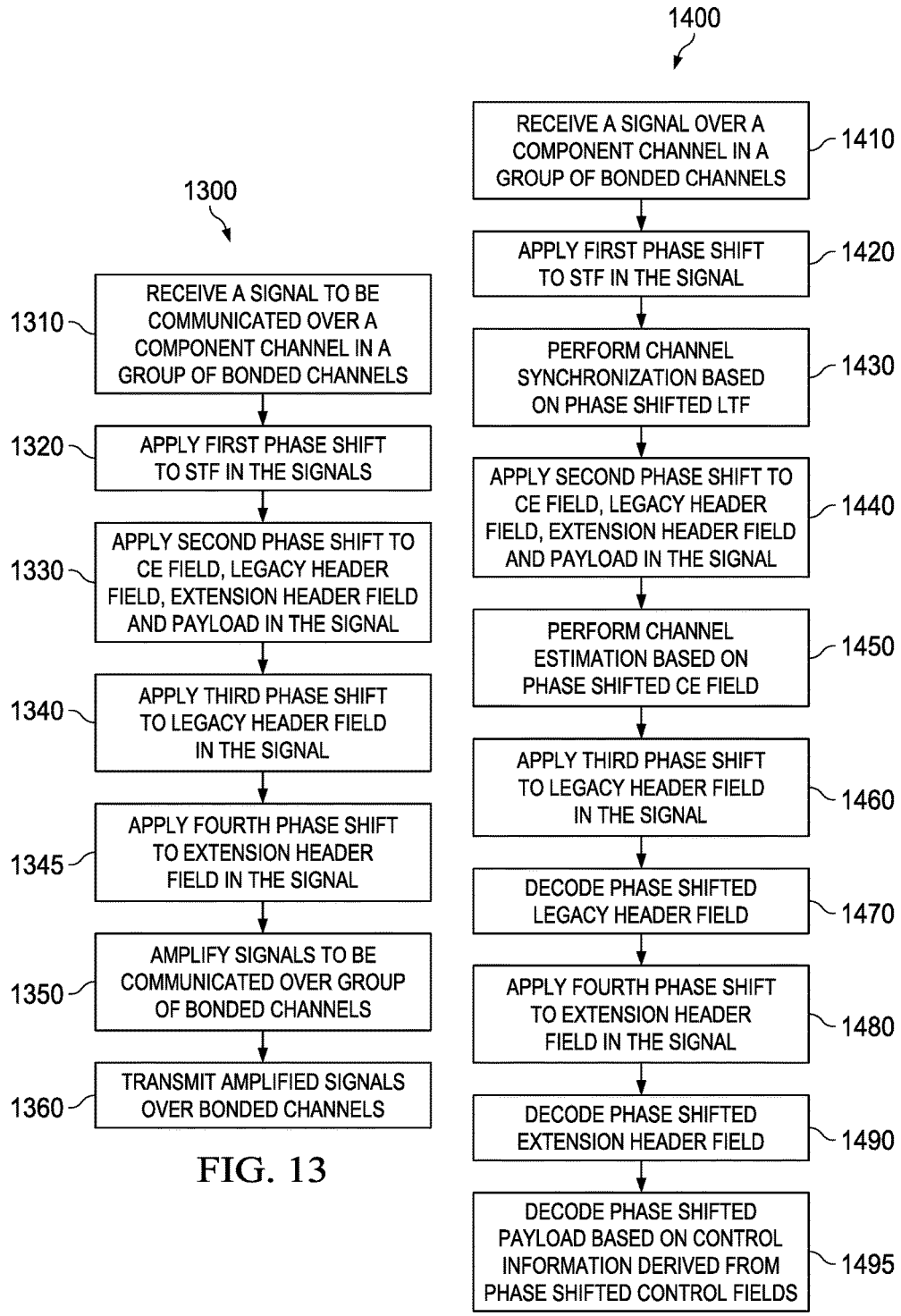
FIG. 13 is a flowchart of an embodiment method for transmitting OFDM signals over bonded channels.
FIG. 14 is a flowchart of an embodiment method for receiving OFDM signals over bonded channels.

FIG. 13 is a flowchart of an embodiment method 1300 for transmitting OFDM signals over bonded channels, as might be performed by a transmitter. Steps 1310, 1320, and 1330 are similar to steps 910, 920, and 930 in FIG. 9. At step 1340, the transmitter applies a third phase shift to the legacy header field in the signal. The transmitter may also apply different phase shifts to legacy header fields in the other signals to be communicated over the group of bonded channels. At step 1345, the transmitter applies a fourth phase shift to the extension header field in the signal. The fourth phase shift may be equal in magnitude to the third phase shift. The transmitter may also apply different phase shifts to extension header fields in other signals to be communicated over the group of bonded channels. At step 1350, the transmitter amplifies the signals to be communicated over bonded channels. At step 1360, the transmitter transmits the signals over the bonded channels.

FIG. 14 is a flowchart of an embodiment method 1400 for receiving signals over bonded channels, as might be performed by a receiver. Steps 1410, 1420, 1430, 1440, and 1450 are similar to steps 1010, 1020, 1030, 1040, and 1050 in FIG. 10. At step 1460, the receiver applies a third phase shift to the legacy header field in the signal. The receiver may also apply different phase shifts to legacy header fields communicated over the other bonded channels. At step 1470, the receiver decodes the phase-shifted legacy header field. The receiver may also decode phase-shifted legacy header fields communicated over the other bonded channels. At step 1480, the receiver applies a fourth phase shift to the extension header field in the signal. The receiver may also apply different phase shifts to extension header fields communicated over the other bonded channels. At step 1490, the receiver decodes the phase-shifted extension header field. The receiver may also decode phase-shifted extension header fields communicated over the other bonded channels. At step 1495, the receiver decodes the phase-shifted payload based on control information derived from the phase-shifted control fields. The receiver may also decode phase-shifted payloads communicated over the other bonded channels.

Figure 15:
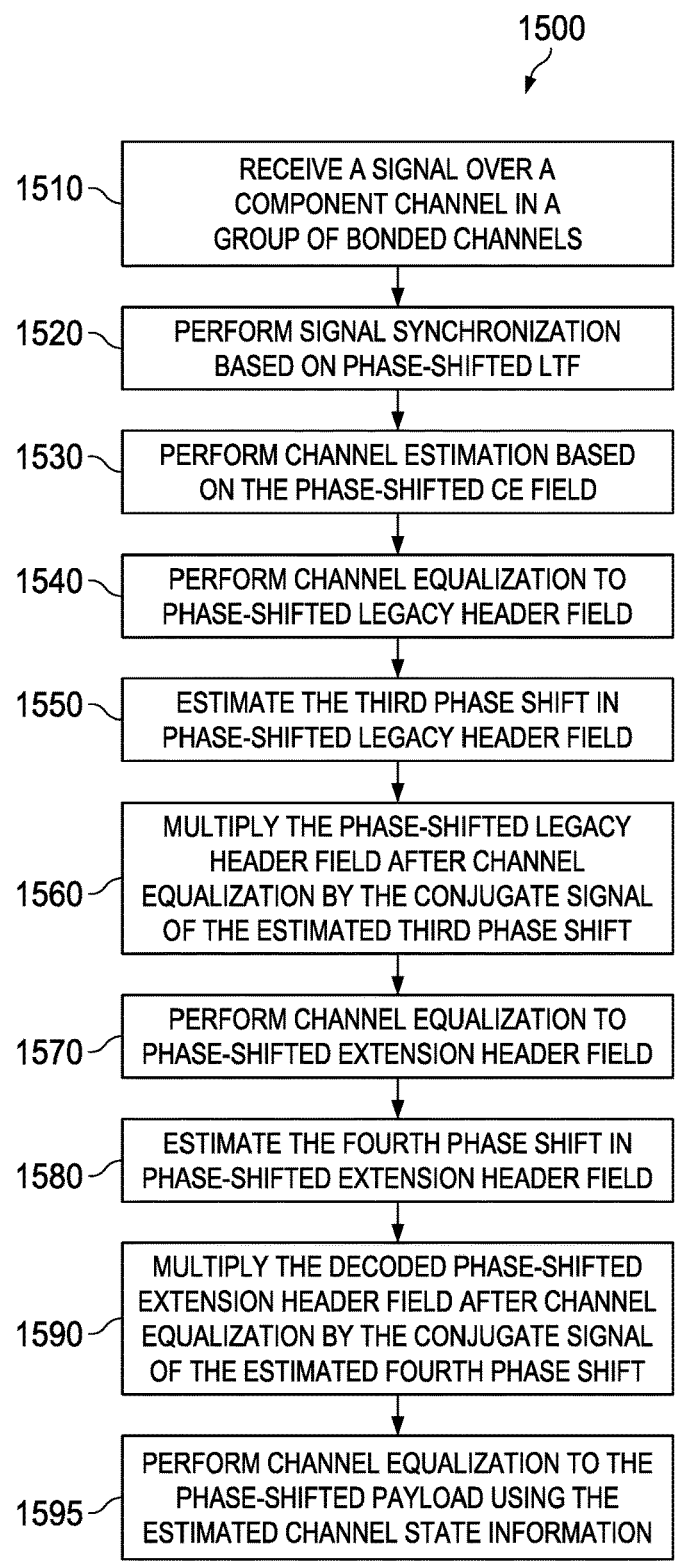
FIG. 15 is a flowchart of another embodiment method for receiving OFDM signals over bonded channels.

FIG. 15 is a flowchart of an embodiment method 1500 for receiving signals over bonded channels, as might be performed by a receiver. Steps 1510, 1520, 1530 are similar to steps 1110, 1120, 1130 in FIG. 11. At step 1540, the receiver performs channel equalization to the phase-shifted legacy header field using the estimated channel state information based on the received phase-shifted CE field. The receiver may also perform channel equalization to the phase-shifted legacy field communicated over the other component channels.

At step 1550, the receiver estimates the third phase shift to the phase-shifted legacy header field after channel equalization. The receiver may also estimate the third phase shift to the phase-shifted legacy header field after channel equalization communicated over the other bonded channels.

At step 1560, the receiver multiplies the phase-shifted legacy header field after channel equalization by the conjugate signal of the estimated third phase shift. The receiver may also multiply the phase-shifted legacy header field after channel equalization by the conjugate signal of the estimated third phase shift.

At step 1570, the receiver performs channel equalization to the phase-shifted extension header field using the estimated channel state information based on the received phase-shifted CE field. The receiver may also perform channel equalization to the phase-shifted extension header fields communicated over the other bonded channels.

At step 1580, the receiver estimates the fourth phase shift to the phase-shifted extension header field after channel equalization. The receiver may also estimate the fourth phase shift to the phase-shifted extension header field after channel equalization communicated over the other bonded channels.

At step 1590, the receiver multiplies the decoded phase-shifted extension header field after channel equalization by the conjugate signal of the estimated fourth phase shift. The receiver may also multiply the phase-shifted extension header field after channel equalization over the other bonded channels by the conjugate signal of the estimated fourth phase shift.

At step 1595, the receiver performs channel equalization to the phase-shifted payload using the estimated channel state information based on the received phase-shifted CE field. The receiver may also perform channel equalization to phase-shifted payloads communicated over the other bonded channels using the estimated channel state information based on the received phase-shifted CE field.

Figure 16:
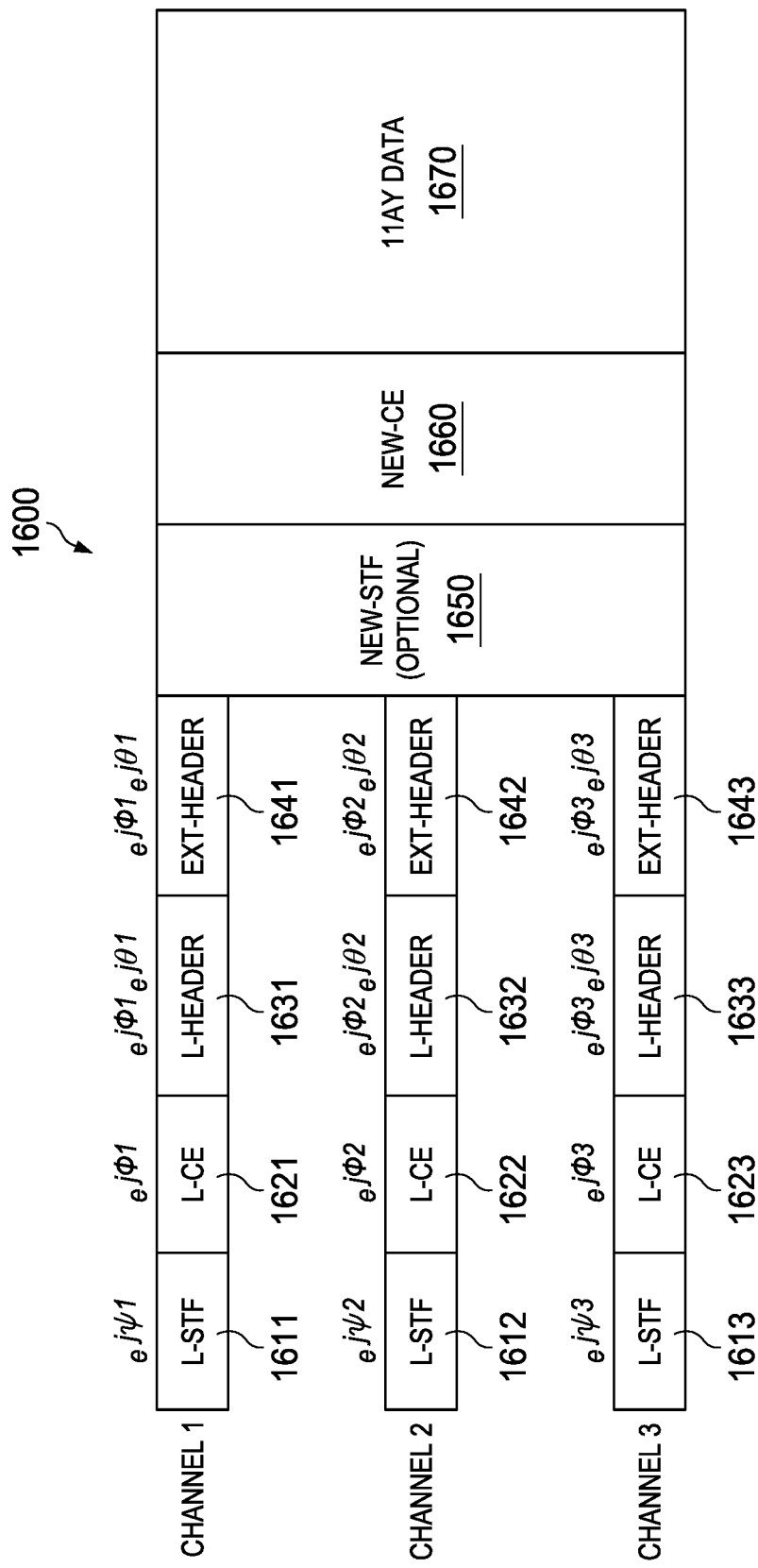
FIG. 16 is a diagram of a wideband frame structure for carrying data over the bonded channels using SC waveforms.

Techniques for phase shifting control fields may be applied to wideband frame formats over bonded channels in order to reduce the PAPR of amplified signals. FIG. 16 is a diagram of a wideband frame structure 1600 for carrying data over the bonded channels using SC waveforms. As shown, the wideband frame structure 1600 includes L-STFs 1611, 1612, 1613, L-CE fields 1621, 1622, 1623, legacy headers 1631, 1632, 1633, extension headers 1641, 1642, 1643, an IEEE 802.11ay STF (New-STF) 1650, an IEEE 802.11ay CE (New-CE) field 1660, and an IEEE 802.11ay payload (flay-Data) 1670. The fields in the wideband frame structure 1600 are similar to corresponding fields in the wideband frame structure 400. The phase shifts applied to the L-STFs 1611, 1612, 1613, L-CE fields 1621, 1622, 1623, legacy headers 1631, 1632, 1633, extension headers 1641, 1642, 1643 in the embodiment wideband frame structure 1600 are similar to the phase shifts applied to the L-STFs 611, 612, 613, L-CE fields 621, 622, 623, legacy headers 631, 632, 633, extension headers 641, 642, 643 in the embodiment frame structure 600. However, unlike the frame structure 600, it is not necessary to apply the same phase shift to the IEEE 802.11ay payload 1670 as was applied to the L-CE fields 1621, 1622, 1623, because the wideband 11ay-STF field 1650, 11ay-CE field 1660, and 11ay-Data field are all transmitted over a single wide frequency band with a common phase.

Techniques for transmitting the wideband frame structure 1600 may be similar to those discussed with reference to FIG. 9, except that the second phase shift is not applied to the payload in step 930. Techniques for receiving the wideband frame structure 1600 may be similar to those discussed with reference to FIG. 10, except that the second phase shift is not applied to the payload in step 1040, additional steps for decoding the 802.11ay STFs and CE fields may be included, and the step 1080 may decode the payload based on control information in both the phase-shifted control fields and the 802.11ay STFs and CE fields 1650, 1660.

Figure 17:
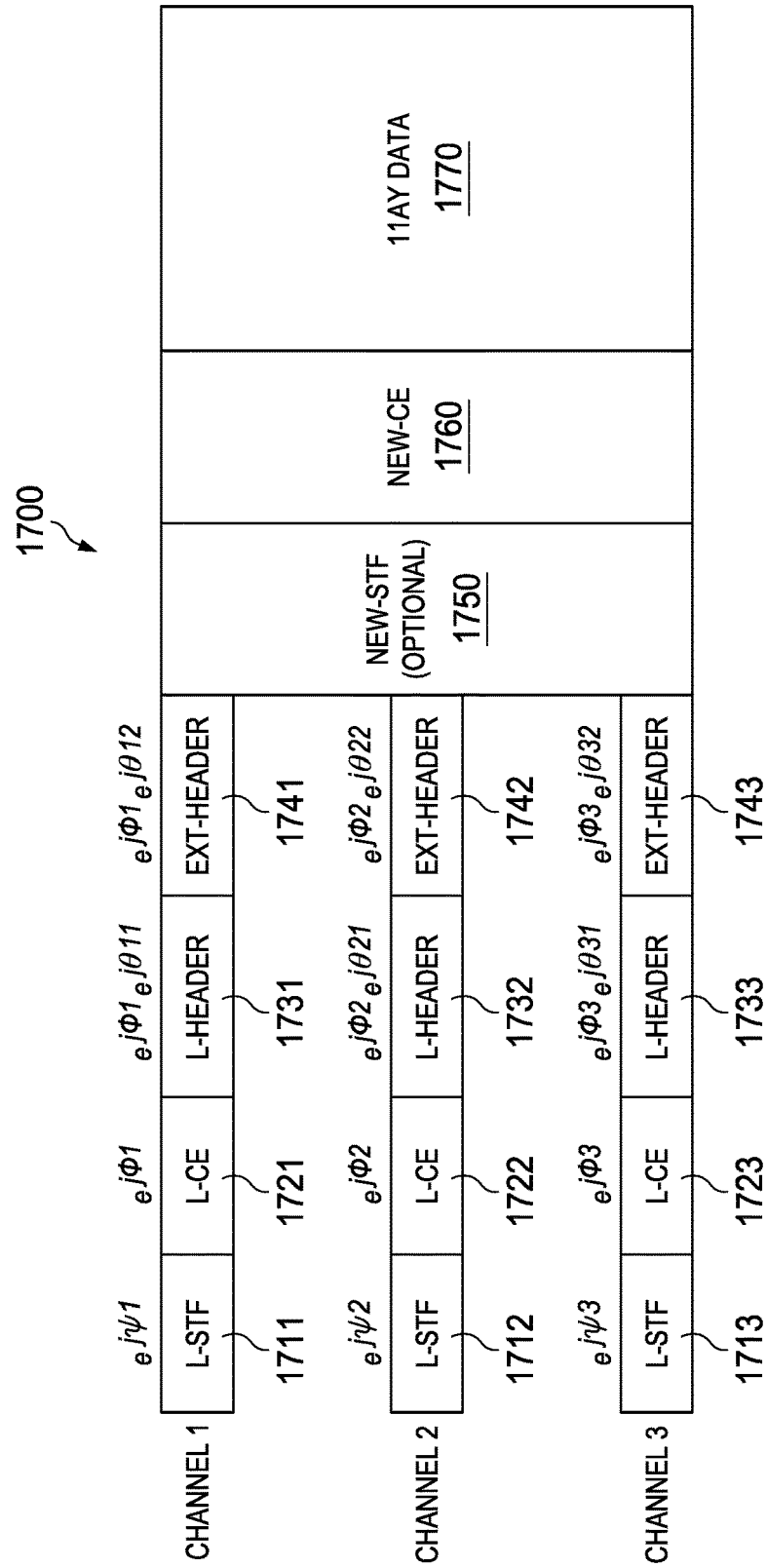
FIG. 17 is a diagram of a wideband frame structure for carrying data over the bonded channels using OFDM waveforms.

FIG. 17 is a diagram of a wideband frame structure 1700 for carrying data over bonded channels using OFDM waveforms. As shown, the wideband frame structure 1700 includes L-STFs 1711, 1712, 1713, L-CE fields 1721, 1722, 1723, legacy headers 1731, 1732, 1733, extension headers 1741, 1742, 1743, an IEEE 802.11ay STF (New-STF) 1750, an IEEE 802.11ay CE (New-CE) 1760, and an IEEE 802.11ay payload (11ay-Data) 1770. The fields in the wideband frame structure 1700 are similar to corresponding fields in the wideband frame structure 400. The phase shifts applied to the L-STFs 1711, 1712, 1713, L-CE fields 1721, 1722, 1723, legacy headers 1731, 1732, 1733, extension headers 1741, 1742, 1743 in the embodiment wideband frame structure 1700 are similar to the phase shifts applied to the L-STFs 1211, 1212, 1213, L-CE fields 1221, 1222, 1223, legacy headers 1231, 1232, 1233, extension headers 1241, 1242, 1243 in the embodiment frame structure 1200. However, unlike the frame structure 1200, it is not necessary to apply the same phase shift to the IEEE 802.11ay payload 1770 as was applied to the L-CE fields 1721, 1722, 1723.

Techniques for transmitting the wideband frame structure 1700 may be similar to those discussed with reference to FIG. 13, except that the second phase shift is not applied to the payload in step 1330. Techniques for receiving the wideband frame structure 1700 may be similar to those discussed with reference to FIG. 14, except that the second phase shift is not applied to the payload in step 1540, additional steps for decoding the 802.11ay STFs and CE fields may be included, and the step 1595 may decode the payload based on control information in both the phase-shifted control fields and the 802.11ay LTFs and CE fields.

Figure 18:
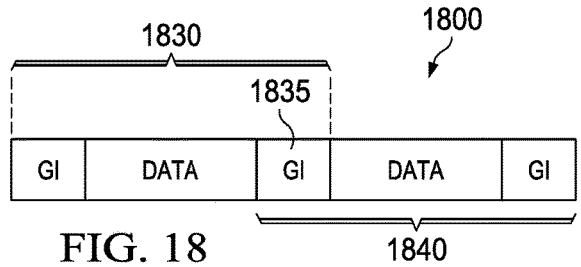
FIG. 18 is a diagram of data field blocking in SC.

As discussed above, it may be beneficial to use a different phase shift for legacy and extension header fields carried in OFDM waveforms. FIG. 18 is a diagram of an embodiment SC header format 1800 that includes a legacy header 1830 and an extension header 1840. As shown, the legacy header 1830 and the extension header 1840 overlap in the time domain such that the guard interval 1835 is included in both the legacy header 1830 and the extension header 1840. The guard interval 1835 is a predefined sequence of symbols that is included to mitigate inter-symbol interference between the legacy header 1830 and the extension header 1840. In this embodiment, because the guard interval is part of both the legacy header 1830 and the extension header 1840, the legacy header 1830 and the extension header 1840 must have the same phase shift.

Figure 19:
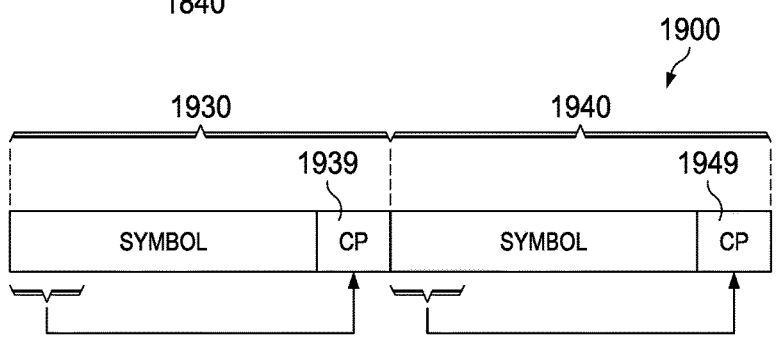
FIG. 19 is a diagram of data field blocking in OFDM.

FIG. 19 is a diagram of an embodiment OFDM header format 1900 that includes a legacy header 1930 and an extension header 1940. As shown, the legacy header 1930 includes a cyclic prefix (CP) 1939 that is a repetition of the first portion of the legacy header 1930, and the extension header 1940 includes a cyclic prefix (CP) 1949 that is a repetition of the first portion of the extension header 1940. In this embodiment, because the legacy header 1930 and the extension header 1940 are non-overlapping, it is possible to apply a first phase shift to the legacy header 1930 and a different phase shift to the extension header 1940.

Figure 20:
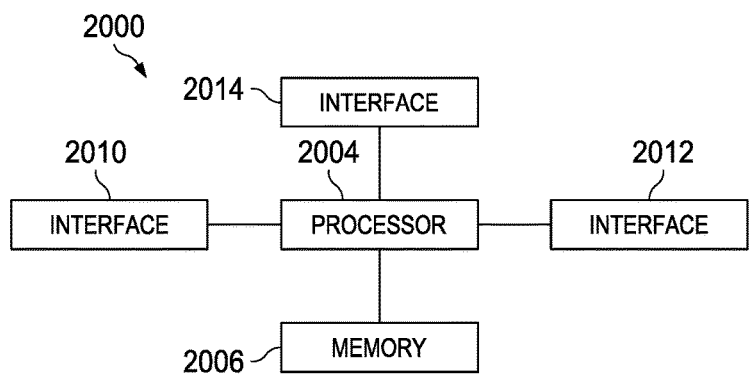
FIG. 20 is a diagram of an embodiment processing system.

FIG. 20 is a block diagram of an embodiment processing system 2000 for performing methods described herein, which may be installed in a host device. As shown, the processing system 2000 includes a processor 2004, a memory 2006, and interfaces 2010-2014, which may (or may not) be arranged as shown in FIG. 20. The processor 2004 may be any component or collection of components adapted to perform computations and/or other processing related tasks, and the memory 2006 may be any component or collection of components adapted to store programming and/or instructions for execution by the processor 2004. In an embodiment, the memory 2006 includes a non-transitory computer readable medium. The interfaces 2010, 2012, 2014 may be any component or collection of components that allow the processing system 2000 to communicate with other devices/components and/or a user. For example, one or more of the interfaces 2010, 2012, 2014 may be adapted to communicate data, control, or management messages from the processor 2004 to applications installed on the host device and/or a remote device. As another example, one or more of the interfaces 2010, 2012, 2014 may be adapted to allow a user or user device (e.g., personal computer (PC), etc.) to interact/communicate with the processing system 2000. The processing system 2000 may include additional components not depicted in FIG. 20, such as long term storage (e.g., non-volatile memory, etc.).

In some embodiments, the processing system 2000 is included in a network device that is accessing, or part otherwise of, a telecommunications network. In one example, the processing system 2000 is in a network-side device in a wireless or wireline telecommunications network, such as a base station, a relay station, a scheduler, a controller, a gateway, a router, an applications server, or any other device in the telecommunications network. In other embodiments, the processing system 2000 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 21:
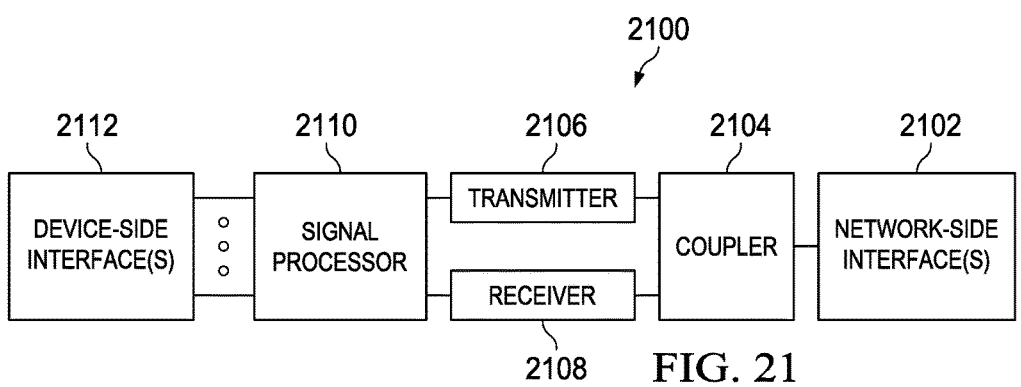
FIG. 21 is a diagram of an embodiment transceiver.

In some embodiments, one or more of the interfaces 2010, 2012, 2014 connects the processing system 2000 to a transceiver adapted to transmit and receive signaling over the telecommunications network. FIG. 21 is a block diagram of a transceiver 2100 adapted to transmit and receive signaling over a telecommunications network. The transceiver 2100 may be installed in a host device. As shown, the transceiver 2100 comprises a network-side interface 2102, a coupler 2104, a transmitter 2106, a receiver 2108, a signal processor 2110, and a device-side interface 2112. The network-side interface 2102 may include any component or collection of components adapted to transmit or receive signaling over a wireless or wireline telecommunications network. The coupler 2104 may include any component or collection of components adapted to facilitate bi-directional communication over the network-side interface 2102. The transmitter 2106 may include any component or collection of components (e.g., up-converter, power amplifier, etc.) adapted to convert a baseband signal into a modulated carrier signal suitable for transmission over the network-side interface 2102. The receiver 2108 may include any component or collection of components (e.g., down-converter, low noise amplifier, etc.) adapted to convert a carrier signal received over the network-side interface 2102 into a baseband signal. The signal processor 2110 may include any component or collection of components adapted to convert a baseband signal into a data signal suitable for communication over the device-side interface(s) 2112, or vice-versa. The device-side interface(s) 2112 may include any component or collection of components adapted to communicate data-signals between the signal processor 2110 and components within the host device (e.g., the processing system 2000, local area network (LAN) ports, etc.).

The transceiver 2100 may transmit and receive signaling over any type of communications medium. In some embodiments, the transceiver 2100 transmits and receives signaling over a wireless medium. For example, the transceiver 2100 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 2102 comprises one or more antenna/radiating elements. For example, the network-side interface 2102 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 2100 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by an applying unit/module and/or an amplifying unit/module. The respective units/modules may be hardware, software, or a combination thereof. For instance, one or more of the units/modules may be an integrated circuit, such as field programmable gate arrays (FPGAs) or application-specific integrated circuits (ASICs).

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform the same function or achieve the same result as the corresponding embodiments described herein. Accordingly, the appended claims are intended to include within their scope such processes, machines, manufacture, compositions of matter, means, methods, or steps.

Although this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for peak-to-average power ratio (PAPR) reduction in channel bonding, the method comprising:
   receiving at least a first signal assigned to a first component channel and a second signal assigned to a second component channel, the first signal including a first control field carrying an identical sequence of symbols as a second control field in the second signal, the first control field and the second control field being assigned to the same time period;
   applying a first phase shift to at least the second control field such that the identical sequence of symbols in the second control field is offset from the identical sequence of symbols in the first control field in the time domain, the first phase shift being a non-zero phase shift;
   applying a second phase shift to a third control field in the second signal, the second phase shift being different than the first phase shift; and
   transmitting the first signal over the first component channel and the second signal over the second component channel, wherein the first control field, the second control field, and the third control field are legacy control fields.

2. The method of claim 1, wherein the first control field and the second control field are transmitted in the same time period.

3. The method of claim 1, wherein applying the second phase shift to the second control field creates, or increases, a time domain offset between a signal peak in the second control field and a corresponding signal peak in the first control field.

4. The method of claim 1, wherein the first component channel and the second component channel are bonded channels, and wherein transmitting the first signal over the first component channel and the second signal over the second component channel comprises:
   amplifying both the first signal and the second signal to obtain an amplified signal; and
   transmitting the amplified signal over the bonded channels.

5. The method of claim 4, wherein applying the second phase shift to the second control field creates, or increases, a time domain offset between a signal peak in the second control field and a corresponding signal peak in the first control field, thereby reducing the PAPR of the amplified signal.

6. The method of claim 1, wherein the first control field and the second control field are short training fields (STFs) communicated over bonded channels.

7. The method of claim 1, wherein the first control field and the second control field are channel estimation (CE) fields communicated over bonded channels.

8. The method of claim 7, wherein the first signal further includes a first legacy header, a first extension header, and a first payload, wherein the second signal further includes a second legacy header, a second extension header, and a second payload, and wherein the method further comprises applying the second phase shift to the second legacy header, the second extension header, and the second payload in the second signal.

9. The method of claim 1, wherein the first control field and the second control field are header fields communicated over bonded channels.

10. An apparatus comprising:
    a processor; and
    a non-transitory computer readable storage medium storing programming for execution by the processor, the programming including instructions to:
    receive at least a first signal assigned to a first component channel and a second signal assigned to a second component channel, the first signal including a first control field carrying an identical sequence of symbols as a second control field in the second signal, the first control field and the second control field being assigned to the same time period;
    apply a first phase shift to at least the second control field such that the identical sequence of symbols in the second control field is offset from the identical sequence of symbols in the first control field in the time domain;
    apply a second phase shift to a third control field in the second signal, the second phase shift being different than the first phase shift; and
    transmit the first signal over the first component channel and the second signal over the second component channel, wherein the first control field, the second control field, and the third control field are legacy control fields.

11. A method for peak-to-average power ratio (PAPR) reduction in channel bonding, the method comprising:
    receiving at least a first signal assigned to a first component channel and a second signal assigned to a second component channel, both the first signal and the second signal including a short training field (STF), channel estimation (CE) field, and a header field, both the STF in the first signal and the STF in the second signal being assigned to a first time period, both the CE field in the first signal and the CE field in the second signal being assigned to a second time period, and both the header field in the first signal and the header field in the second signal being assigned to a third time period;
    applying a first phase shift to the STF in the second signal, a second phase shift to the CE in the second signal, and a third phase shift to the header field in the second signal, wherein the first phase shift, the second phase shift, and the third phase shift are different than one another; and
    transmitting the first signal over the first component channel and the second signal over the second component channel.

12. The method of claim 11, wherein applying the first phase shift to the STF in the second signal, the second phase shift to the CE in the second signal and the third phase shift to the header field in the second signal creates, or increases, a time domain offset between signal peaks in the STF, the CE, and the header field in the second signal and corresponding signal peaks in the STF, the CE, and the header field in the first signal.

13. The method of claim 11, wherein the first component channel and the second component channel are bonded channels, and wherein transmitting the first signal over the first component channel and the second signal over the second component channel comprises:
    amplifying both the first signal and the second signal to obtain an amplified signal; and
    transmitting the amplified signal over the bonded channels.

14. The method of claim 13, wherein applying the first phase shift to the STF in the second signal, the second phase shift to the CE in the second signal and the third phase shift to the header field in the second signal creates, or increases, a time domain offset between signal peaks in the STF, the CE, and the header field in the second signal and corresponding signal peaks in the STF, the CE, and the header field in the first signal, thereby reducing the PAPR of the amplified signal.

15. An apparatus comprising:
a processor; and
a non-transitory computer readable storage medium storing programming for execution by the processor, the programming including instructions to:
receive at least a first signal assigned to a first component channel and a second signal assigned to a second component channel, both the first signal and the second signal including a short training field (STF), channel estimation (CE) field, and a header field, both the STF in the first signal and the STF in the second signal being assigned to a first time period, both the CE field in the first signal and the CE field in the second signal being assigned to a second time period, and both the header field in the first signal and the header field in the second signal being assigned to a third time period;
apply a first phase shift to the STF in the second signal, a second phase shift to the CE in the second signal and a third phase shift to the header field in the second signal, wherein the first phase shift, the second phase shift, and the third phase shift are different than one another; and
transmit the first signal over the first component channel and the second signal over the second component channel.

16. The apparatus of claim 15, wherein applying the first phase shift to the STF in the second signal, the second phase shift to the CE in the second signal and the third phase shift to the header field in the second signal creates, or increases, a time domain offset between signal peaks in the STF, the CE, and the header field in the second signal and corresponding signal peaks in the STF, the CE, and the header field in the first signal.

17. The apparatus of claim 10, wherein the first control field and the second control field are transmitted in the same time period.

18. The apparatus of claim 10, wherein applying the second phase shift to the second control field creates, or increases, a time domain offset between a signal peak in the second control field and a corresponding signal peak in the first control field.

19. The apparatus of claim 10, wherein the first component channel and the second component channel are bonded channels, and wherein the instructions to transmit the first signal over the first component channel and the second signal over the second component channel include instructions to:
amplify both the first signal and the second signal to obtain an amplified signal; and
transmit the amplified signal over the bonded channels.

20. The apparatus of claim 10, wherein the first control field and the second control field are short training fields (STFs) communicated over bonded channels.

* * * * *